United States Patent
Tillemans et al.

(10) Patent No.: US 6,851,900 B2
(45) Date of Patent: Feb. 8, 2005

(54) HOLE CUTTING TOOL

(75) Inventors: Gregory M. Tillemans, Andover, KS (US); James L. Starkey, Wichita, KS (US)

(73) Assignee: Python Perfect Cutter, Inc., Wichita, KS (US)

( * ) Notice: Subject to any disclaimer, the term of this patent is extended or adjusted under 35 U.S.C. 154(b) by 9 days.

(21) Appl. No.: 10/250,165

(22) Filed: Jun. 9, 2003

(65) Prior Publication Data
US 2004/0247407 A1 Dec. 9, 2004

(51) Int. Cl.[7] .............................. B23C 1/20; B27C 5/10
(52) U.S. Cl. ...................... 409/130; 409/131; 409/132; 409/137; 409/179; 409/182; 408/76; 408/67
(58) Field of Search ................................. 409/130, 137, 409/178, 179, 182; 408/76, 67; 144/144.51, 252.1

(56) References Cited

U.S. PATENT DOCUMENTS

| | | | | |
|---|---|---|---|---|
| 4,244,669 A | * | 1/1981 | Puritz et al. ................. | 409/137 |
| 4,575,290 A | * | 3/1986 | Adair .......................... | 409/132 |
| 4,599,018 A | * | 7/1986 | Woods ......................... | 408/76 |
| 4,850,763 A | * | 7/1989 | Jack et al. ................... | 409/178 |
| 5,113,951 A | * | 5/1992 | Houben et al. ............... | 408/67 |
| 5,462,392 A | * | 10/1995 | Hardwick ..................... | 408/76 |
| 5,613,811 A | | 3/1997 | Tillemans | |
| 5,775,395 A | * | 7/1998 | Wilkins .................... | 144/144.1 |
| 5,807,034 A | * | 9/1998 | Perlmutter et al. ........... | 408/67 |
| 5,967,209 A | * | 10/1999 | Fukuda .................. | 144/144.51 |
| 6,053,674 A | * | 4/2000 | Thompson .................... | 408/67 |
| 6,099,215 A | * | 8/2000 | Piggott ....................... | 409/131 |
| 6,129,489 A | * | 10/2000 | Linderholm ................ | 409/178 |
| 6,296,426 B1 | * | 10/2001 | King et al. ................... | 408/76 |
| 6,325,435 B1 | * | 12/2001 | Dubuc ........................ | 409/182 |
| 6,413,022 B1 | * | 7/2002 | Sarh ............................ | 408/76 |
| 2002/0141836 A1 | * | 10/2002 | Ege et al. ..................... | 408/67 |
| 2003/0113180 A1 | * | 6/2003 | Schelberg et al. .......... | 409/179 |

* cited by examiner

Primary Examiner—A. L. Wellington
Assistant Examiner—Dana Ross
(74) Attorney, Agent, or Firm—Hovey Williams LLP

(57) ABSTRACT

A hole cutting tool (10) configured for cutting an accurately located and precisely shaped hole in a surface, such as a wall (W) of a finished residential or commercial building is disclosed. The tool (10) provides a frame assembly (12) which is self-adhering to the surface (W) and carries removable templates (14, 146–152) for handsfree use in cutting an accurately located and precisely shaped hole. The unique frame assembly (12) provides multiple selectable, pneumatically isolated suction chambers (50,52) that enable the self-adhesion function even when the frame assembly (12) is placed over existing holes in the surface (W). The suction chambers (50,52) are formed in part by a unique corrugated gasket (56) that enables the frame assembly (12) to self-adhere to porous surfaces. The removable template (14) enables dust particles created during the cutting process to be simultaneously vacuumed away regardless of the orientation of the template (14) relative to the frame assembly (12).

54 Claims, 10 Drawing Sheets

HOLE CUTTING TOOL

BACKGROUND OF INVENTION

1. Field of the Invention

The present invention relates generally to equipment for cutting holes in surfaces, such as walls or ceilings, for receiving construction components, such as electrical outlet boxes, recessed light fixtures, and the like. More specifically, the present invention concerns a hole cutting tool that provides a frame assembly which is self-adhering to the surface and carries a removable template for use in cutting an accurately located and precisely shaped hole. The unique frame assembly provides multiple selectable, pneumatically isolated suction chambers that enable the self-adhesion function even when the frame assembly is placed over existing holes in the surface. The versatile self-adhesion function enables the inventive frame assembly to be used to cut a wide variety of desirably shaped holes using one or more templates in a handsfree manner. In a preferred embodiment, the suction chambers are formed in part by a unique gasket that enables the frame assembly to self-adhere to porous surfaces. In the preferred embodiment, the removable templates enable dust particles created during the cutting process to be simultaneously vacuumed away regardless of the orientation of the template relative to the frame assembly.

2. Discussion of Prior Art

In the construction industry, it is often necessary to cut a particularly configured hole in an existing wall or ceiling of a finished commercial or residential building. For example, an electrical contractor may need to cut a hole in a finished wall to receive an electrical outlet box when installing a new outlet or switch, or may need to cut a hole in a finished ceiling to install a new fixture, such as a recessed light. It is desirable in the construction industry to accurately position these holes, shape them to closely correspond to the outline of the box involved, and cut them in an efficient and clean manner. However, prior art hole cutting techniques (with the exception of the prior art technique previously developed by one of the inventors of the present invention as disclosed and incorporated below) were defective in meeting the needs of the industry. These problems have previously been identified in U.S. Pat. No. 5,613,811, having a common inventor with the present invention and licensed exclusively to the assignee of the present invention, issued Mar. 25, 1997, and entitled DUST-FREE METHOD AND APPARATUS FOR LOCATING AND CUTTING HOLES FOR ELECTRICAL OUTLET BOXES, RECESSED LIGHT FIXTURES AND THE LIKE ("the Tillemans '811 patent"), which is hereby incorporated by reference herein.

The hole cutting apparatus disclosed in the Tillemans '811 patent was a significant advance in the field and solved many of the problems identified in the art at the time. However, it has been determined that electricians in the field are increasingly needing to place electrical outlet boxes that are larger than the standard double gang outlet box, such as two or more double gang boxes in series in the same hole location. Although an electrician could simply use a double gang box template to cut overlapping cuts to form a larger hole, such an application was problematic with the Tillemans '811 apparatus because the previously cut hole would undesirably interfere with the self-adhesion properties of the Tillemans '811 apparatus. That is to say, when a portion of the single vacuum chamber of the Tillemans '811 apparatus overlain an existing portion of the hole, the vacuum pressure was compromised to the point the apparatus would no longer adhere to the wall. In addition, the Tillemans '811 apparatus was ineffective at adhering to a porous surface, such as a "popcorn" ceiling.

SUMMARY OF INVENTION

The present invention provides an improved hole cutting tool that does not suffer from the problems and limitations of the prior art hole cutting techniques and apparatuses as detailed above. The inventive hole cutting tool includes a unique frame assembly that provides multiple selectable, pneumatically isolated suction chambers that enable the frame assembly to self-adhere to a surface even when the assembly is partially placed over existing holes in the surface. In a preferred embodiment, the suction chambers are formed in part by an inventive gasket that enables the frame assembly to self-adhere to porous surfaces.

A first aspect of the present invention concerns a hole cutting tool for cutting a hole in a surface. The tool broadly includes a portable frame assembly adapted to be selectively placed against the surface in which the hole is to be cut, a template supported in the frame assembly, and source of negative air pressure operable to secure the frame assembly against the surface in a temporarily immobilized condition to permit the hole to be cut in the surface using the template-defined opening as a guide. The portable frame assembly includes a first attachment chamber and a second attachment chamber pneumatically isolated from the first chamber when the frame is placed against the surface. The template is positioned at least in part between the first and second chambers and defines an opening in the frame assembly that corresponds at least in part to the outline of the hole to be cut. The a source of negative air pressure is in selective air communication with the first and second chambers and operable to secure the frame assembly against the surface in the temporarily immobilized condition when the negative air pressure source is in air communication with either the first or second chambers.

A second aspect of the present invention concerns a hole cutting tool for cutting a hole in a surface. The tool broadly includes a portable frame assembly adapted to be selectively placed against the surface in which the hole is to be cut, a template supported in the frame assembly and defining an opening in the frame assembly that corresponds at least in part to the outline of the hole to be cut, and a source of negative air pressure operable to secure the frame assembly against the surface in a temporarily immobilized condition to permit the hole to be cut in the surface using the template-defined opening as a guide. The portable frame assembly defines at least one attachment chamber when the frame is placed against the surface. The negative air source is in air communication with the attachment chamber. The frame assembly includes a plate and at least one gasket that cooperate to define the at least one attachment chamber when the frame is placed against the surface. The gasket presents a corrugated contact surface adapted to sealingly engage the surface in which the hole is to be cut when the frame assembly is placed there against.

A third aspect of the present invention concerns a method of cutting a hole in a surface. The method broadly includes the steps of supporting a template in a frame assembly wherein the template defines an opening in the frame assembly that corresponds at least in part to the outline of the hole to be cut and the, placing the frame assembly against the surface in which the hole is to be cut so that the portable frame assembly includes a first attachment chamber and a second attachment chamber pneumatically isolated from the first chamber when the frame is placed against the surface, sucking negative air pressure through one of the first and second attachment chambers to thereby secure the frame assembly against the surface in a temporarily immobilized condition, cutting a hole in the surface using the template-defined opening as a guide, and switching the negative air pressure to the other one of the first and second attachment chambers while maintaining the frame assembly in the immobilized condition.

In a preferred embodiment, when the frame assembly is in the immobilized condition against a surface, the frame assembly is configured to removably receive a support shelf that is further supported on the manifold and is adapted to hold various fixtures along the wall (e.g., a fuse box, etc.) in a handsfree manner to facilitate securing the fixtures to the wall. The preferred embodiment further includes removable templates that enable dust particles created during the cutting process to be simultaneously vacuumed away regardless of the orientation of the template relative to the frame assembly.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
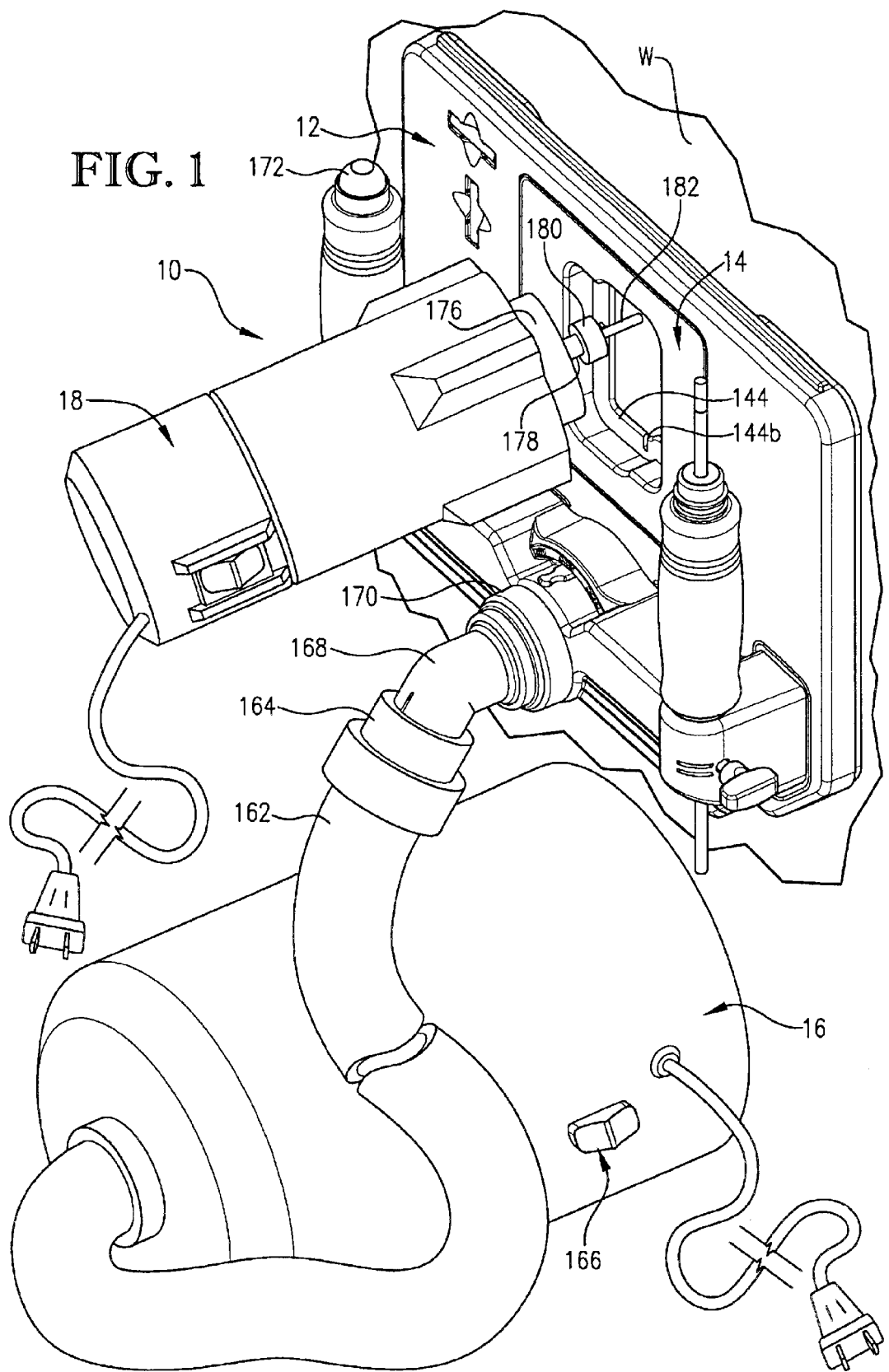
FIG. 1 is a perspective view of a hole cutting tool constructed in accordance with a preferred embodiment of the present invention and shown with the frame assembly in the temporary immobilized condition against a wall and shown with a single gang box template supported in the frame assembly.

FIG. 1 illustrates a hole cutting tool 10 constructed in accordance with the principles of a preferred embodiment of the present invention and configured for cutting an accurately located and precisely shaped hole in a surface, such as a wall W of a finished residential or commercial building. Although the hole cutting tool 10 is illustrated in use on the finished wall W, the principles of the present invention are not limited to finished wall applications, or even to hole cutting applications. As further detailed below, the principles of the present invention are equally applicable to hole cutting applications on virtually any surface, including ceilings and floors, whether finished or unfinished, flat surfaces as well as semi-flat surfaces, such as textured walls, ceilings, and floors. Additionally, while the principles of the present invention are particularly well suited for hole cutting applications, the principles of the present invention are also applicable to other construction operations where it is desirable to utilize a self-adhering frame assembly to enable handsfree support during the operation, such as mounting a fuse box as detailed below. The illustrated hole cutting tool 10 broadly includes a portable frame assembly 12 for selectively placing against the surface W in which the hole is to be cut, a template 14 supported in the frame assembly 12 to define the outline of the hole to be cut, a vacuum source 16 in air communication with the frame assembly 12 to secure the frame assembly 12 against the surface W in a temporarily immobilized condition, and a powered cutter 18 for cutting the hole using the template-defined outline as a guide when the frame assembly 12 is in the immobilized condition.

Turning to FIGS. 2–8, the portable frame assembly 12 is configured to support the template 14 against the surface W in a handsfree manner to enable the user to cut the desired guided hole in the surface W in an efficient, effective, and clean manner. The illustrated frame assembly 12 broadly includes a base plate 20, a manifold 22 coupled to the base plate 20, and a valve assembly 24 housed in the manifold 22. The base plate 20 supports and/or houses the components of the frame assembly 12 and defines the multiple suction chambers as detailed below. In more detail, the illustrated base plate 20 is generally rectangular in configuration presenting a front face 20a and a rear face 20b, and defines a generally centrally located, quadrated template-receiving opening 26. As will be further described in detail below, in the illustrated frame assembly 12, the templates (e.g., the template 14) are loaded into the base plate 20 from the rear. Accordingly, the template-receiving opening 26 includes a retaining lip 26a integrally formed with the front face of the plate 20 that cooperates with the surface W to retain the template 14 in place when the frame assembly 12 is in the immobilized condition against the wall W (see FIG. 4). Although not shown, the base plate 20 preferably includes structure associated with the edges of the template-receiving opening 26 to removably retain the templates in the plate 20 (e.g., detent tabs, points along the edges having thicker side walls, etc.). For purposes that will subsequently be described, formed in the plate 20 along the bottom edge of the template-receiving opening 26 is a dust passageway 26b. It is within the ambit of the present invention to utilize various alternative configurations for loading the templates into the base plate, including front-loading of the templates. Suitable alternatives are disclosed in the Tillemans '811 patent, previously incorporated by reference herein.

The plate 20 is sized and configured to facilitate portability of the frame assembly 12. In this regard, the base plate 20 is preferably formed of a durable, yet light-weight material, such as a molded plastic, or the like. Additionally, the base plate 20 is fitted with handles 28 and 30 sized and dimensioned to enable the user to grip the handles 28,30 with his or her hands to thereby transport and/or manipulate the frame assembly 12. In the illustrated frame assembly 12, the handles 28,30 are fixed to the manifold 22 and for purposes that will subsequently be described, each present a hollow internal passageway there through.

The illustrated base plate 20 includes level-receiving indentations 32 and 34 configured to receive corresponding horizontal and vertical levels 36 and 38, respectively. The levels 36,38 are conventional bubble-type levels that press or snap into the indentations 32,34. As further detailed below, the levels 36,38 facilitate accurately locating the templates, such as the template 14, level relative to the floor and/or ceiling adjoining the wall W. For purposes that will subsequently be described, the illustrated base plate 20 further includes a shelf attachment clip 40 formed along the upper edge of the base plate 20 (see FIGS. 2–3 and 6). The clip 40 opens towards the rear face 20b of the plate 20 and extends along substantially the entire upper edge of the plate 20.

Figure 4:
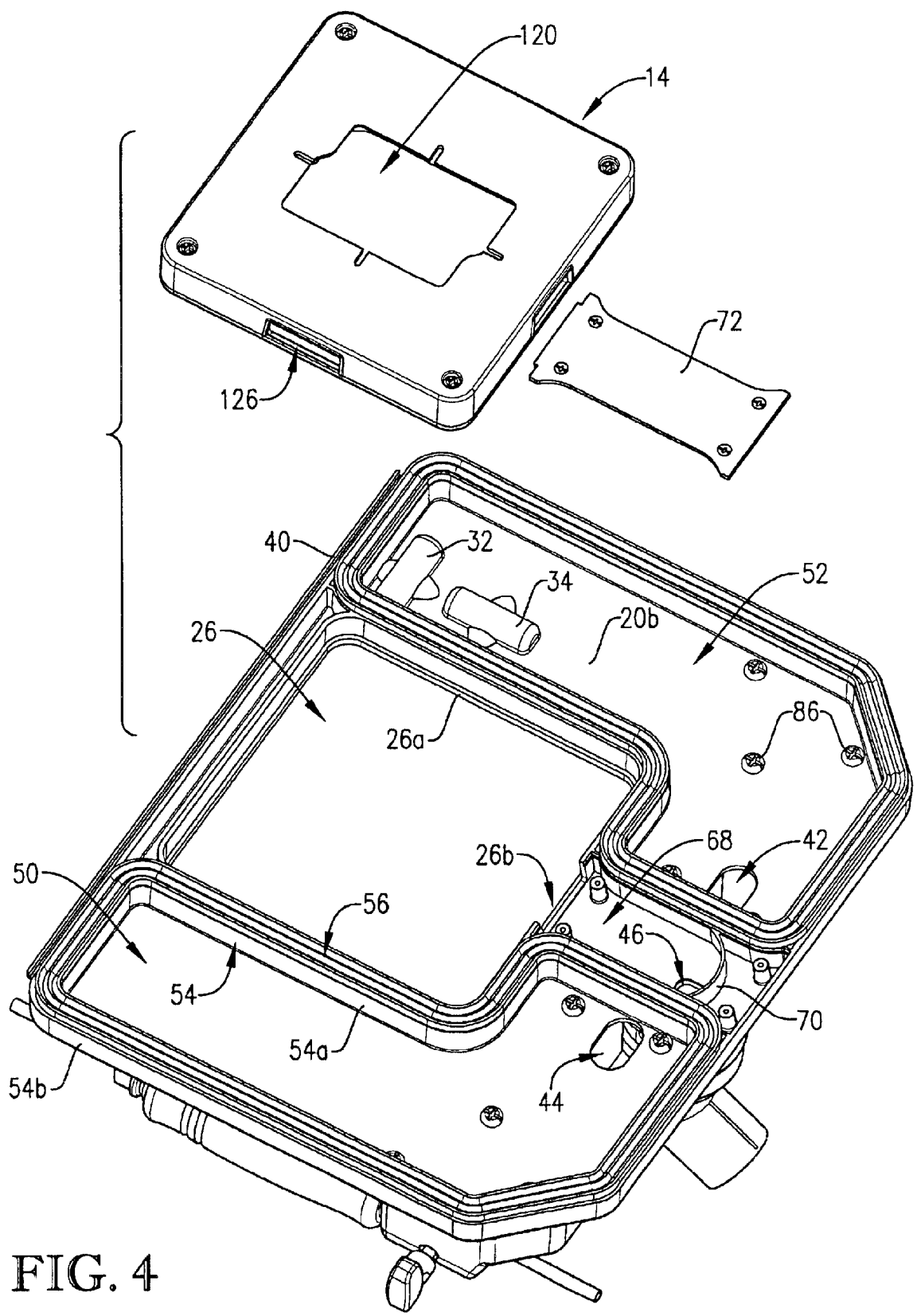
FIG. 4 is an exploded assembly view of the frame assembly illustrated in FIGS. 1–3 with the dust inlet cover disassembled for illustrative purposes and showing the rear entry loading of the single gang box template.
Figure 6:
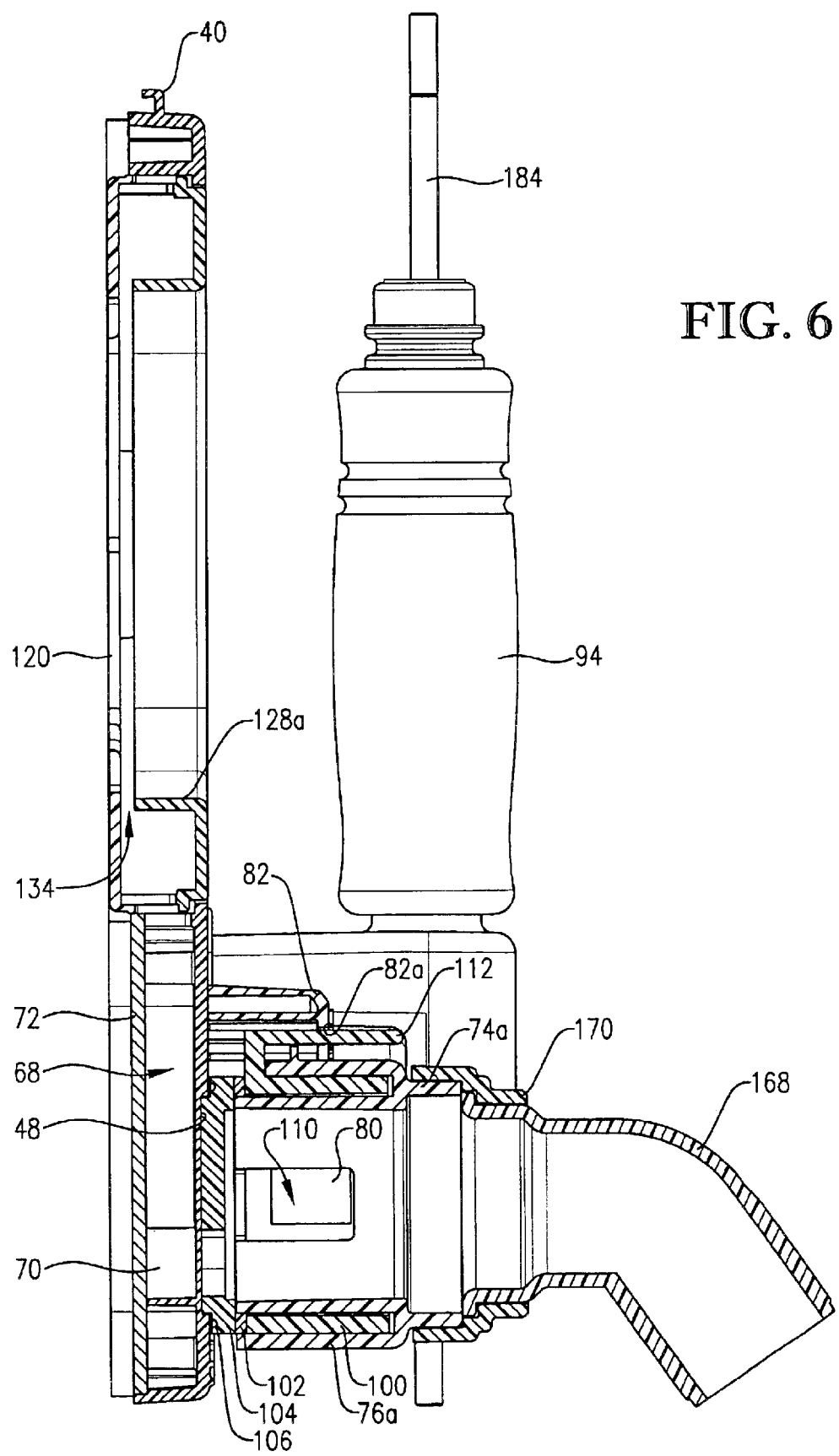
FIG. 6 is a sectional view of the frame assembly taken substantially along line 6—6 of FIG. 3.
Figure 8:
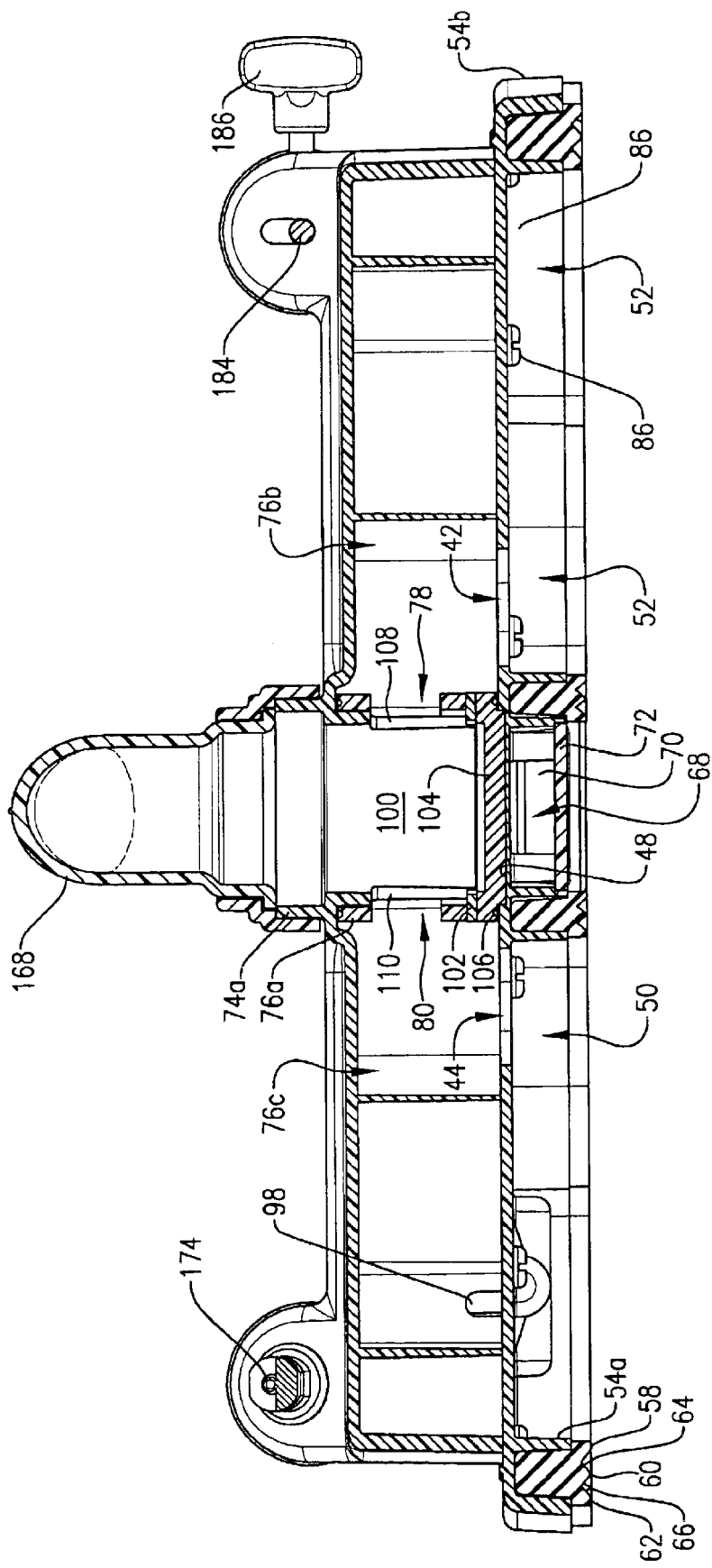
FIG. 8 is a sectional view of the frame assembly taken substantially along line 8—8 of FIG. 3.

For purposes that will subsequently be described in detail, portions of the base plate 20 are in air communication with the vacuum source 16 via the manifold 22. Particularly, as shown in FIGS. 4 and 8, the illustrated base plate 20 includes a pair of vacuum ports 42 and 44 and a dust inlet port 46. Each of the ports 42,44,46 are formed entirely through the plate 20 to thereby provide air communication between the front and rear faces 20a,20b. The vacuum ports 42,44 are spaced from one another and positioned on respective sides of the vertical center of the plate 20. The dust inlet port 46 is spaced from each of the vacuum ports 42,44 and positioned there between. For purposes that will subsequently be described, the dust inlet port 46 is slightly offset from the vertical center of the plate 20. Additionally, as will be described in detail below and as shown in FIGS. 6 and 8, formed in the front face 20a of the plate 20 is a valve-receiving recess 48. The recess 48 is generally circular in configuration and does not extend entirely through the plate 20. The dust inlet port 46 is formed through the recess 48 and thereby communicates therewith.

As will be further described in detail below, the unique frame assembly 12 provides multiple selectable, pneumatically isolated suction chambers that enable the frame assembly 12 to self-adhere to the surface W even when the assembly 12 is partially placed over existing holes in the surface W. In this regard, the base plate 20 defines a pair of pneumatically isolated attachment chambers 50 and 52 when the frame assembly 12 is in the immobilized condition against the wall W. The illustrated attachment chambers 50,52 are mirror images of each other, but otherwise are virtually identical in configuration. Accordingly, only the right attachment chamber 50 will be described in detail with the understanding that the left attachment chamber 52 is similarly constructed. In more detail, and turning to FIG. 4, the attachment chamber 50 is a vacuum chamber and is defined by the rear face 20b of the plate 20, a channel 54 projecting out of the rear face 20b of the plate 20, and an endless gasket 56 received within the channel 54. It will be appreciated that the chamber 50 is open along one entire face thereof, but that such open face will become closed by the surface W when the frame assembly 12 is sealed against the wall W during use. The channel 54 defines a generally L-shaped outer margin of the attachment chamber 50 and includes spaced inner and outer walls 54a and 54b, respectively. The illustrated walls 54a,54b are integrally formed with the base plate 20 and project out of the rear face 20b thereof so that when the frame assembly 12 is placed against the surface W, the rear face 20b is spaced from the surface W. The outer wall 54b in part forms a portion of the outer margin of the base plate 20 and in part forms the right edge of the template-receiving opening 26 and a portion of the lower edge of the opening 26.

Figure 7:
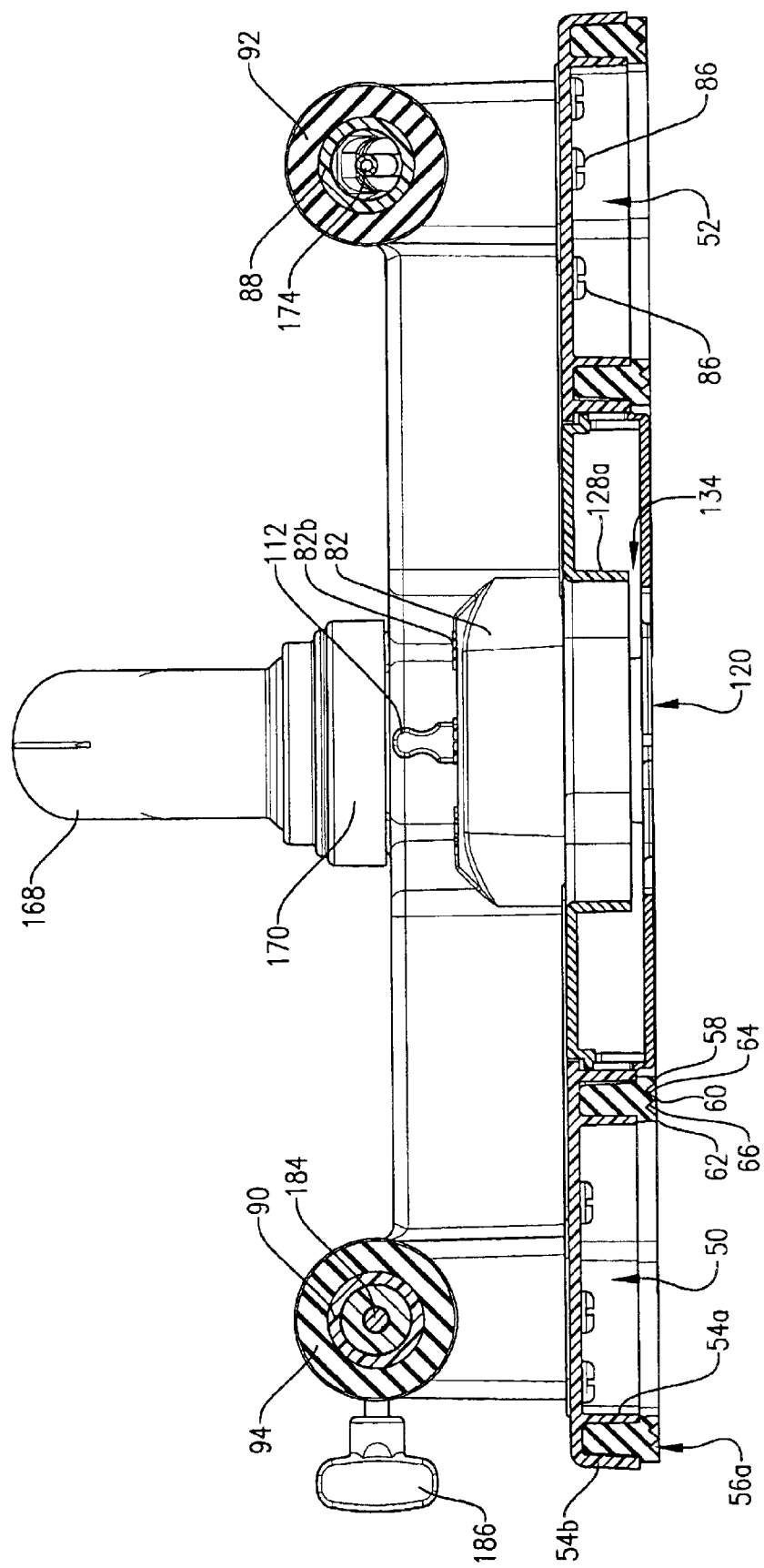
FIG. 7 is a sectional view of the frame assembly taken substantially along line 7—7 of FIG. 3.

The gasket 56 is configured to seal against the surface W when the frame assembly 12 is in the immobilized condition to pneumatically isolate the attachment chamber 50 from the surrounding environment, including the adjacent chamber 52. Particularly, the illustrated gasket 56 is sized and dimensioned to be frictionally received and retained in the channel 54. As shown in FIGS. 7 and 8, the gasket 56 extends out over the ends of the channel walls 54a,54b to define a contact surface 56a for sealingly engaging the surface W. The gasket 56 is preferably formed from a suitably pliable material that enables the gasket 56 to seal against the surface W even where the surface W includes some non-flat imperfections (e.g., indentations, projecting nail heads, etc.) yet is sufficiently rigid to maintain the seal when exposed to the vacuum pressure required to maintain the frame assembly 12 in the immobilized condition (as detailed below). One such suitable material is a thermoplastic elastomer material ("TPE material"). The TPE material preferably presents a hardness having a Durometer A scale value of between about eight and ten. Although the TPE material is preferred, it is within the ambit of the present invention to utilize other various materials for the gaskets, such as urethanes, silicon-based materials, etc.

In addition to the gasket material, the unique gasket 56 is also configured to enable the attachment chamber 50 to seal against the surface W even where the surface W is only a semi-flat surface, such as a "popcorn" styled ceiling. In this regard, the contact surface 56a of the gasket 56 is corrugated and includes a plurality of concentric ridges 58, 60, and 62 formed in its distal-most end that define a plurality of grooves 64 and 66 therebetween. In more detail, and as shown in FIGS. 4, 7, and 8, each of the ridges 58,60,62 are configured to sealingly engage the surface W when the frame assembly 12 is placed against the wall W and extend coextensively around the entire outer margin of the chamber 50. The ridges 58,60,62 are concentrically positioned relative to each other and in this manner define the grooves 64,66 between the ridges 58,60 and 60,62, respectively. The grooves 64,66 are recessed relative to the ridges 58,60,62 and are each configured to be spaced from the surface W when the frame assembly 12 is placed against the wall W. However, it will be appreciated that the grooves 64,66 may be suctioned against, and engage the wall W when the frame assembly 12 is in the immobilized condition against the wall W. That is to say, the ridges 58,60,62 may become sufficiently deformed under the vacuum pressure from the source 16 that the grooves 64,66 are not spaced from the wall W when the frame assembly is in the immobilized condition. Each of the ridges 58,60,62 are alone configured to pneumatically seal the chamber 50. That is to say, as long as one of the ridges 58,60,62 engages the surface W, the chamber 50 will be pneumatically sealed there against. It is believed that when the gasket 56 engages a surface having relatively small, non-flat undulations, such as the "bumps" presented by a popcorn-type ceiling, the bumps are received in one of the grooves 64,66 or received under any two of the ridges 58,60,62 and thus do not effect the sealing function of at least one of the ridges 58,60,62. In this manner, the ridges 58,60,62 cooperate with the grooves 64,66 to enable the attachment chamber 50 to seal against a semi-flat surface, such as a popcorn-type ceiling. All though the surface 56a can be variously configured, it is important that the surface 56a be corrugated and include at least two ridges and at least one groove.

For purposes that will subsequently be described, the attachment chamber 50 is in air communication with the vacuum port 44 as shown in FIGS. 4 and 8. However, for reasons that will become apparent, the chamber 50 is not in communication with either the vacuum port 42 or the dust inlet port 46. In a similar manner, the attachment chamber 52 is in air communication with the vacuum port 42 but not in communication with the ports 44,46. Otherwise, as indicated above, the attachment chamber 52 is configured similarly to the chamber 50 as detailed above.

As shown in FIG. 4, the upper portions of the attachment chambers 50,52 are positioned on either side of the template-receiving opening 26 and the lower portions are spaced from one another to define a dust inlet 68 between the opening 26 and the chambers 50,52. The dust inlet 68 is configured to place the template-receiving opening 26 in air communication with the vacuum source 16 so that dust particles created during the cutting process can be instantaneously vacuumed out of the frame assembly 12 and the template loaded therein, such as the template 14. In more detail, the illustrated dust inlet 68 is formed by the lower portions of the outer walls of the gasket-receiving channels of the chambers 50,52 (e.g., the outer wall 54b of the channel 54) and by a dust inlet bottom wall 70 extending between the chambers 50,52. The bottom face of the dust inlet 68 is closed by the rear face 20b of the base plate 20 and the top face of the inlet 68 is closed by a dust inlet cover plate 72. In this regard, formed in the base plate 20 are a plurality of raised screw-receiving posts 74 (see FIG. 4). The relevant portions of the outer walls of the chamber channels surrounding the dust inlet 68 are grooved to receive the cover plate 72 and the posts 74 and the bottom wall 70 are configured to be correspondingly recessed so that the cover plate 72 fits flush with the chamber channels and thus does not interfere with the corrugated sealing surface of the gaskets (e.g., surface 56a of gasket 56)(see FIGS. 6 and 8). When the cover plate 72 is screwed over the dust inlet 68, the dust inlet 68 communicates with the opening 26 through the dust passageway 26b and the dust inlet port 46. However, the dust inlet 68 is pneumatically isolated from each of the attachment chambers 50,52.

Figure 5:
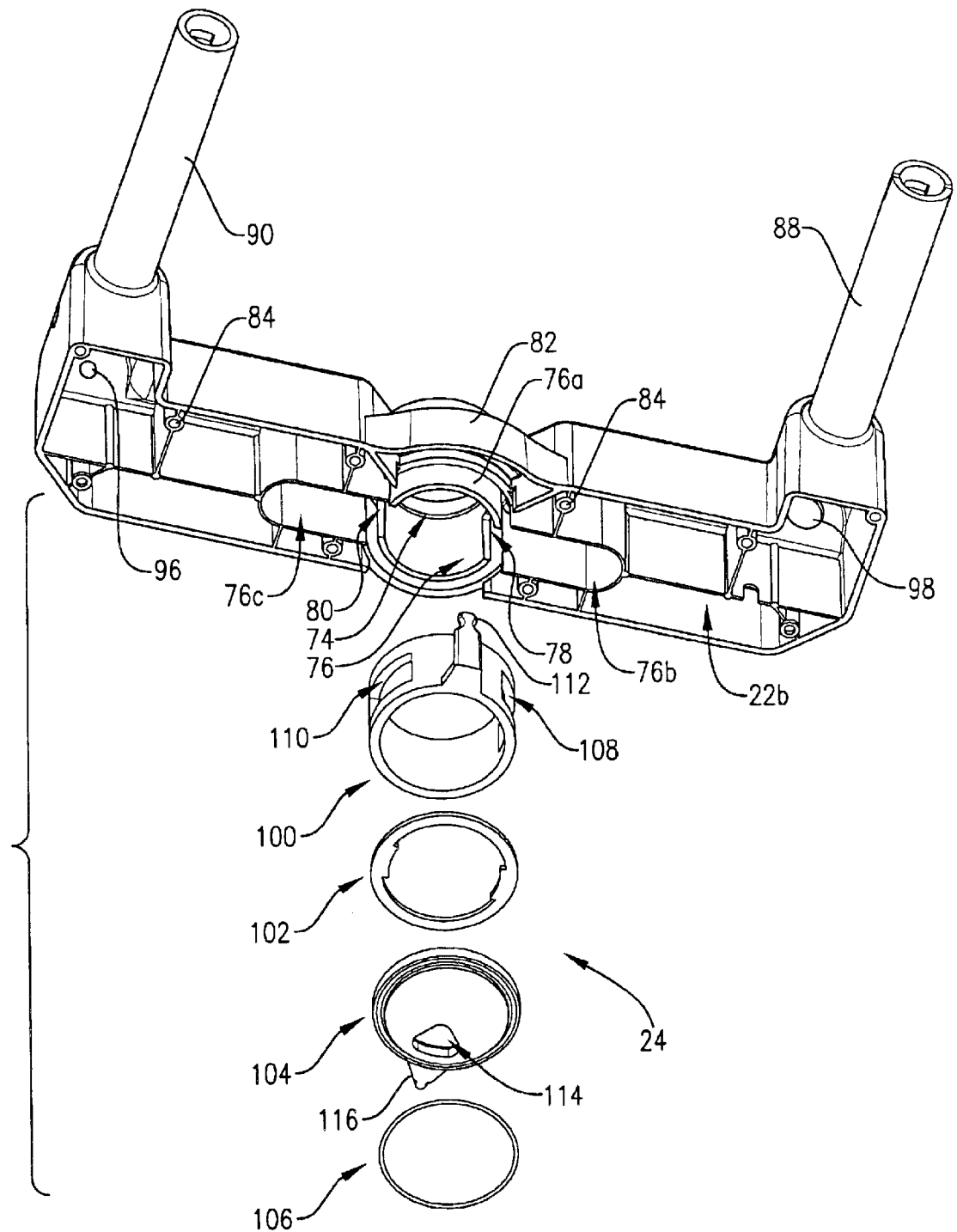
FIG. 5 is an exploded assembly view of the manifold and the valve assembly of the frame assembly illustrated in FIGS. 1–4 showing the assembly of the vacuum valve and the dust inlet valve on the manifold.

As shown in FIGS. 1–8, and particularly as shown in FIG. 5, the manifold 22 is coupled between the vacuum source 16 and the base plate 20 to thereby place the attachment chambers 50,52 and the dust inlet 68 in air communication with the vacuum source 16. The manifold 22 receives the valve assembly 24 and is coupled to the front face 20a of the base plate 20. In more detail, the illustrated manifold 22 is of a unitary construction, such as formed from molded plastic, and presents a generally closed front face 22a and a generally open rear face 22b. Formed through the faces 20a,20b and communicating therewith, is a centrally located flow through section 74 (see FIG. 5) that defines a central passageway and is pneumatically isolated from the rest of the manifold 22 when the manifold 22 is coupled to the base plate 20. As shown in FIGS. 5 and 6, the flow through section 74 includes an outermost cylindrical collar 74a configured to couplingly receive a portion of the vacuum source 16 (as detailed below). As shown in FIG. 5, formed in the back side of the flow through section 74 is a valve-receiving housing 76 configured to receive the valve assembly 24. The valve-receiving housing 76 includes a channeled valve collar 76a and left and right winged portions 76b and 76c, respectively. The valve collar 76a includes a pair of slotted ports 78 and 80 formed therein that communicate the corresponding winged portions 76b,76c, respectively, with the center passageway of the flow through section 74. Each of the winged portions 76b,76c are configured to encircle the corresponding vacuum ports 42,44, respectively, when the manifold 22 is coupled to the base plate 22 to thereby pneumatically communicate the center passageway of the flow through section 74 with the respective attachment chambers 50,52. Formed in the manifold 22 above the flow through section 74 is a valve control indicator plate 82. The indicator plate 82 is spaced from the channeled valve collar 76a to form a valve control slot 82a there between (see FIG. 6). For reasons that will subsequently become apparent, written on the front face of the indicator plate 82 are sequentially spaced valve control designations 82b, including "Left," "Both," and "Right" (see FIG. 3). However, any suitable designations could be utilized, including visual symbols, such as arrows, etc.

The illustrated manifold 22 is screwed to the base plate 20 and in this regard includes a plurality of screw-receiving apertures 84 configured to receive a plurality of screws 86 (see FIGS. 4 and 5). Additionally, as indicated above, in the illustrated manifold 22 the handles 28,30 are fixed thereto and each present a hollow internal passageway there through. In this regard, the manifold 22 includes integrally formed, hollow handle posts 88 and 90 that receive corresponding pliable handle grips 92 and 94, respectively (see FIG. 7). For reasons that will subsequently become apparent, formed through the manifold 22 beneath the handle posts 88,90 are a corresponding bar-receiving apertures 96 and line-receiving apertures 98, respectively (see FIGS. 6 and 8).

The valve assembly 24 is housed in the manifold 22 and is configured to selectively control air communication between the vacuum source 16 and the attachment chambers 50,52 and the dust inlet 68. The illustrated valve assembly 24 includes a rotary vacuum valve 100, a stationary spacer 102, a rotary dust control valve 104, and a sealing O-ring 106 that are all configured to axially align with the center passageway of the flow through section 74. In more detail, and as shown in FIGS. 5 and 6, the rotary vacuum valve 100 is sealingly and rotatably received on the channeled valve collar 76a of the valve-receiving housing 76 for selectively-controlling air communication between the vacuum source 16 and the attachment chambers 50,52. The vacuum valve 100 is generally cylindrically shaped and open at both ends. The cylindrically shaped valve 100 is sized and dimensioned to be frictionally received in a sealing relationship in the channel of the valve collar 76a (see FIG. 6). Formed on each side of the cylindrical wall of the valve 100 are corresponding left and right valve ports 108 and 110, respectively, each configured to cooperate with a respective one of the slotted ports 78,80 in the valve collar 76a to control air flow through the associated vacuum ports 42,44. Integrally formed in the illustrated valve 100 is a valve control bar 112. The valve control 112 is configured so that when the valve 100 is received over the valve collar 76a, the control 112 is shiftably received in the valve control slot 82a below the indicator plate 82 (see FIG. 6). In this regard, the user can grip the valve control 112 and shift the control 112 between the control designations 82b. The alignment of the valve control 112 and each of the respective control designations 82b correspond to the valve 100 being in one of three different control positions a dual chamber position, a left chamber position, and a right chamber position.

When the valve 100 is in the dual chamber position as shown in FIG. 6, corresponding to the valve control 112 being centrally aligned under the designation 82b of "Both," the valve 100 enables air communication between the vacuum source 16 (e.g., through the central passageway of the flow through section 74) and both of the attachment chambers 50,52. That is to say, when the vacuum valve 100 is in the dual chamber position, both of the valve ports 108,110 align with a corresponding slotted port 78,80, respectively. The valve ports 108,110 are oversized relative to the slotted ports 78,80 and thus the bottom edge of each of the ports 108,110 generally aligns with the bottom edge of the corresponding slotted port 78,80 when the valve 100 is in the dual chamber position (see FIG. 6).

In order to rotate the valve 100 to the left chamber position, the user simply slides the valve control 112 all the way to the left until the control 112 aligns under the designation 82b of "Left." When the valve 100 is in the left chamber position, the valve 100 enables air communication between the vacuum source 16 and the attachment chamber 52 while simultaneously preventing air communication between the vacuum source 16 and the attachment chamber 50. That is to say, when the vacuum valve 100 is in the left chamber position, the valve port 108 aligns with the slotted port 78, however, the valve port 110 does not align with the slotted port 80. In this left chamber position, the top edge of the oversized valve port 108 aligns with the top edge of the slotted port 78 thereby communicating the central passageway of the flow through section 74 with the vacuum port 42 through the left wing portion 76b. However, the bottom edge of the valve port 110 extends past the top edge of the slotted port 80 thereby closing off the right wing portion 76c so that the central passageway of the flow through section 74 is not in communication with the vacuum port 44.

In order to rotate the valve 100 to the right chamber position, the user simply slides the valve control 112 all the way to the right until the control 112 aligns under the designation 82b of "Right." When the valve 100 is in the right chamber position, the valve 100 enables air communication between the vacuum source 16 and the attachment chamber 50 while simultaneously preventing air communication between the vacuum source 16 and the attachment chamber 52. That is to say, when the vacuum valve 100 is in the right chamber position, the valve port 110 aligns with the slotted port 80, however, the valve port 108 does not align with the slotted port 78. In this right chamber position, the top edge of the oversized valve port 110 aligns with the top edge of the slotted port 80 thereby communicating the central passageway of the flow through section 74 with the vacuum port 44 through the right wing portion 76c. However, the bottom edge of the valve port 108 extends past the top edge of the slotted port 78 thereby closing off the left wing portion 76b so that the central passageway of the flow through section 74 is not in communication with the vacuum port 42.

During assembly, the cylindrical vacuum valve 100 is slid onto the channeled valve collar 76a as shown in FIG. 6. Once the vacuum valve 100 is placed on the collar 76a, the stationary spacer 102 is placed over the collar 76a against the valve 100 (see FIG. 6). As shown in FIG. 5, the spacer 102 is a hollow ring that does not obstruct the center passageway of the flow through section 74, however, the spacer 102 includes a pair of tabs 102a and 102b that correspond to the slotted ports 78,80, respectively, in the flow through section 74. The tabs 102a,102b fit within the slotted ports 78,80 to prevent the spacer 102 from rotating when one or both of the valves 100,104 are rotated. In this regard, operation of each of the valves 100,104 is independent of, and does not interfere with, operation of the other one of the valves 100,104.

Figure 2:
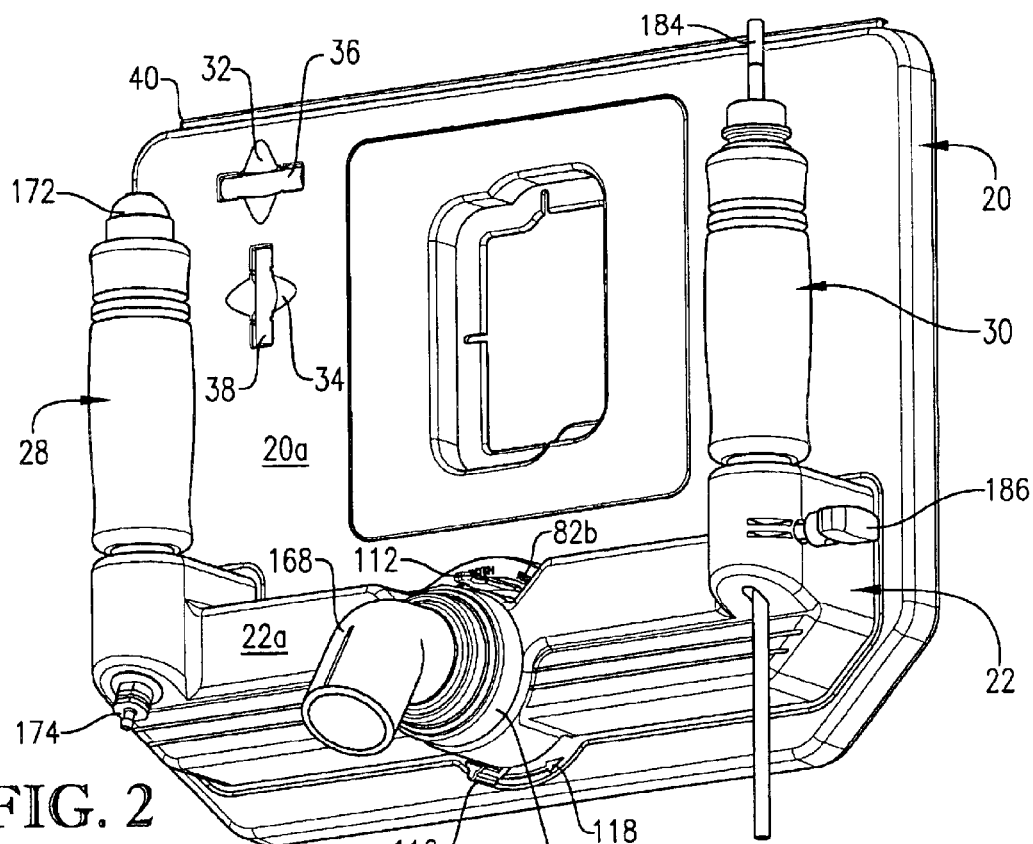
FIG. 2 is a perspective view of the template-laden frame assembly of the hole cutting tool illustrated in FIG. 1.
Figure 3:
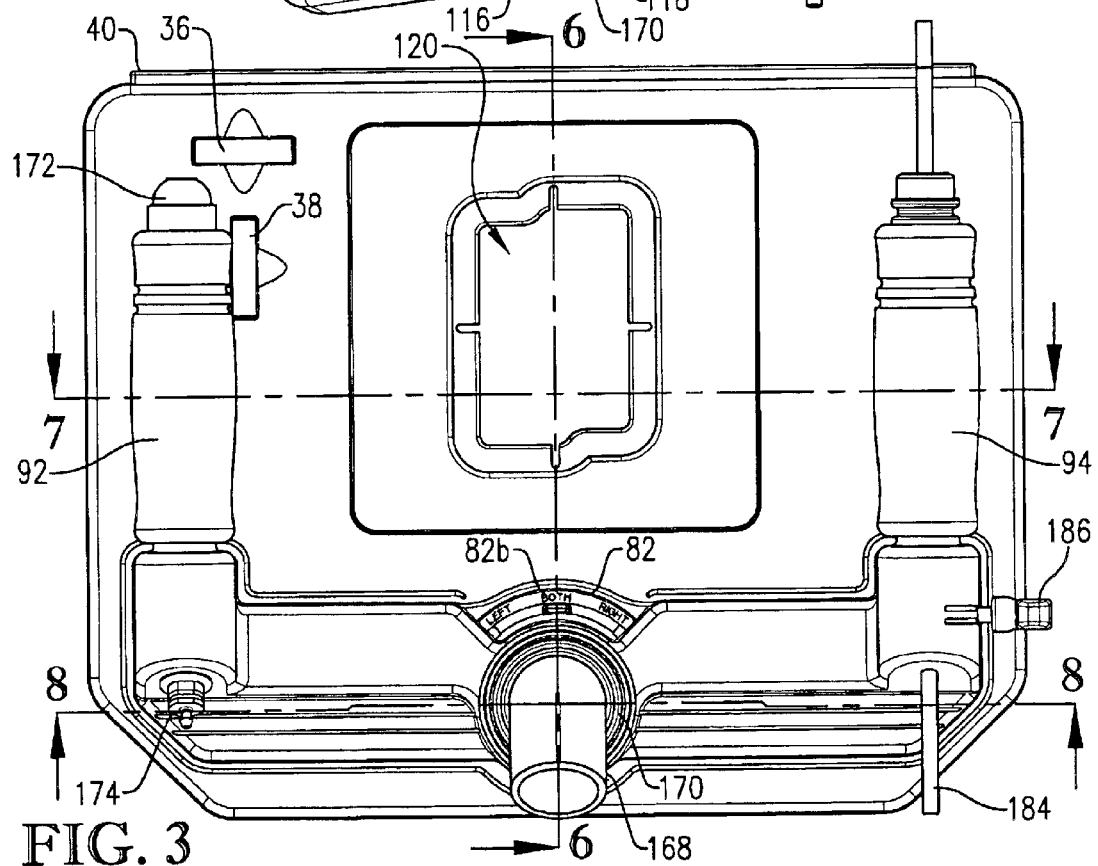
FIG. 3 is a front elevational view of the frame assembly illustrated in FIGS. 2–3.

The dust control valve 104 is sealingly and rotatably between the spacer 102 and the base plate 20 for selectively controlling air communication between the vacuum source 16 and the dust inlet 68. Particularly, the dust valve 104 is received in the valve-receiving recess 48 of the base plate 20. The illustrated dust valve 104 is a generally cylindrically shaped disc embossed along its back face to be rotatably received within the recess 48. The dust valve 104 is further configured to receive the O-ring 106 to thereby seal between the dust valve 104 and the base plate 20 as shown in FIG. 6. Unlike the vacuum valve 100, the dust control valve 104 is not open on both ends but rather has a closed disc configuration except for the triangular shaped dust valve port 114 formed therein (see FIG. 5). The dust valve port 114 is sized and dimensioned to correspond to the dust inlet port 46 formed in the base plate 20. The dust control valve 104 further includes a dust valve control knob 116 integrally formed therewith and positioned centrally beneath, and aligned with, the dust valve port 114. The dust control valve 104 is rotatable into and out of a closed position (as shown in FIG. 2) wherein the dust valve port 114 does not communicate with the dust inlet port 46 to thereby prevent air communication between the vacuum source 16 (via the central passageway of the flow through section 74) and the dust inlet 68. As previously indicated, and as shown in FIG. 4, the dust inlet port 46 is offset to the right of the vertical center of the base plate 20. In this manner, when the dust control valve 104 is in the closed position, the dust control port 114 is completely offset from the dust inlet port 46 so that the disc configuration of the valve 104 prevents are flow through the two ports 46,104. However, the dust valve control port 114 is sized and configured so that when the dust control valve 104 is not in the closed position i.e., rotated any degree to the right the dust valve port 114 at least in part communicates with the dust inlet port 46. In this regard, the quantity of air pressure drawn through the ports 46,104 is variable up to a fully communicating condition where the dust control knob 116 is moved all the way to the right and the two ports 46,114 are generally coextensive. The illustrated manifold 22 includes a dust valve control designation 118 formed beneath the control knob 116 (see FIG. 2). In the illustrated manifold 22, the designation 118 comprises an arrow pointing to the right i.e., with the arrowhead corresponding to the fully communicating condition wherein the maximum quantity of air pressure is being drawn through the ports 46,114 and thus the dust inlet 68.

The frame assembly 12, including the base plate 20, the manifold 22, and the valve assembly 24, could be variously alternatively configured. For example, the frame assembly could include more than two attachment chambers that are selectively controlled by a system different than the manifold/valve assembly described above. However, it is important that the frame assembly define at least two attachment chambers, each being capable of securing the frame assembly to the surface in a temporarily immobilized condition, to provide the hole cutting flexibility as further detailed below.

The template 14 is supported in the frame assembly 12 and defines the outline of the hole to be cut in the surface W. The template 14 loads into the frame assembly 12 from the rear and is removably retained therein so as to be readily interchangeable with one of several other templates as detailed below. In more detail, and perhaps as best in FIGS. 4, 6–7, and 9, the illustrated template 14 is a single gang template with a centerline web that defines an opening 120 sized and configured to correspond to the outline of a hole sized to receive a single gang electrical outlet box having attachment tabs. The illustrated template 14 comprises a generally square frame that includes a top section 122 coupled to a bottom section 124. When the sections 122,124 are coupled together as shown in FIG. 4, the template 14 defines four template dust ports 126, one defined on each of the four sides of the template 14.

Figure 9:
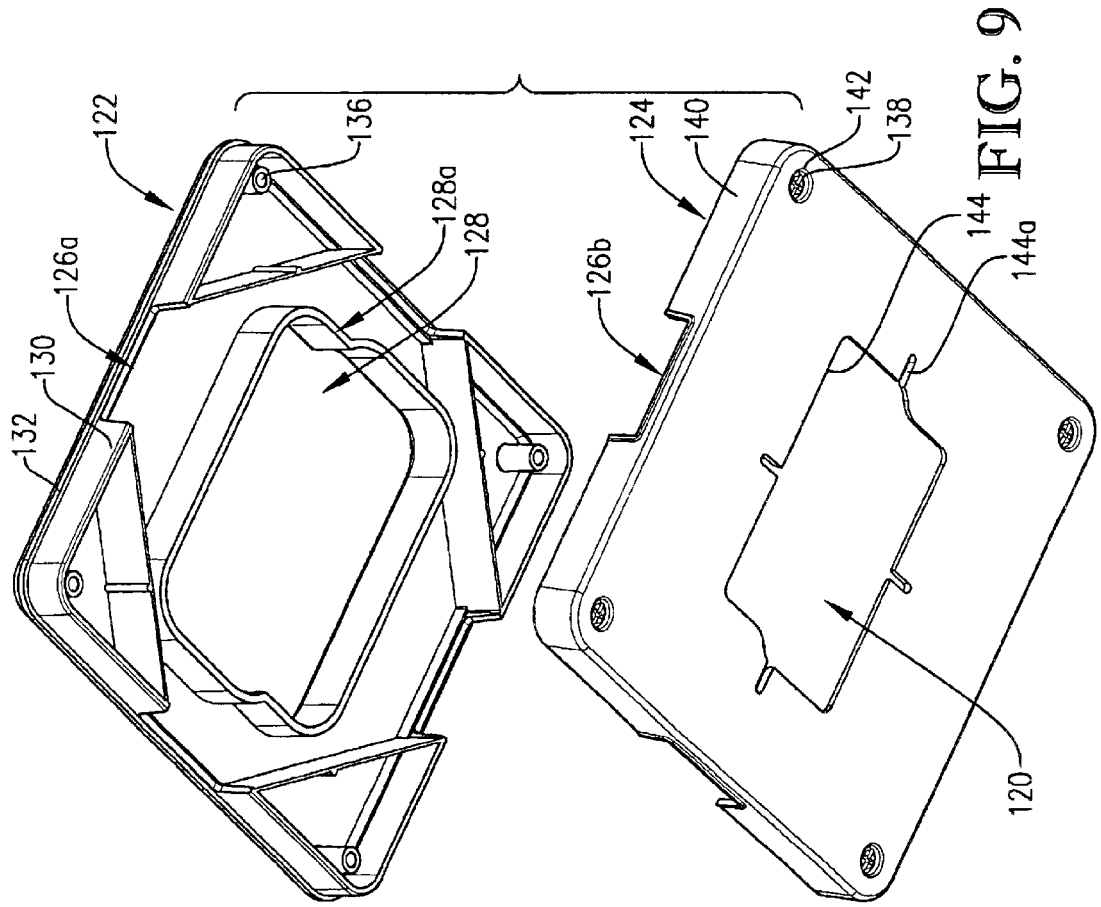
FIG. 9 is an exploded assembly view of the single gang box template removed from the frame assembly illustrated in FIGS. 1–8.

The top section 122 presents a router collar opening 128 defined by a router collar guide 128a surrounding the opening 128 as shown in FIG. 9. The opening 128 is larger than the opening 120 to enable a router collar to slide along the guide 128a, as detailed below, to properly position the cutting blade of the powered cutter 18 to trace the smaller opening 120. The top section 122 further includes four corner gussets 130 that cooperate to define the top portions 126a of the template dust ports 126. The gussets 130 are offset from the outer edge of the section 122 to define a lip 132. The lip 132 is configured to engage the lip 26a formed in the template-receiving opening 26 in the frame assembly 12 to facilitate retaining the template 14 in the frame assembly 12. The lip 132 is also configured to engagingly receive the bottom section 124 to set the set the desired spacing between the sections 122,124. The spacing between the sections 122,124 is importantly configured to enable the guide 128a to be spaced from the bottom section 124 to define a dust ingress 134 around the entire opening 128 (see FIGS. 6 and 7). As detailed below, when the vacuum source 16 is in communication with the dust inlet 68, the dust ingress 134 communicates with the dust inlet 68 through one of the template dust ports 126 to enable dust particles generated in the cutting process to be instantly vacuumed away and into the vacuum source 16 for a clean disposal. The top section 122 further includes a plurality of screw-receiving apertures 136, one located in each of the gussets 130 for receiving screws 138 to couple the top and bottom sections 122,124 together.

The bottom section 124 of the template 14 is complementally configured to the top section 122 so the sections 122,124 can be joined together as indicated above. In this regard, the bottom section 124 includes four corner walls 140 that cooperate to define the bottom portions 126b of the template dust ports 126. Additionally, the bottom section 124 includes a plurality of apertures 142 for receiving the screws 138. The bottom section 124 presents the template opening 120. As indicated above, the opening 120 is smaller than the router collar opening 128. In this regard, the illustrated template 14 includes a centerline web 144 that fills the void presented by the difference in the size of the openings 120,128 (see FIGS. 2 and 3). The web 144 includes a plurality of center cut notches 144a, each being offset from the adjacent notch 144a by ninety degrees and offset from the opposing notch 144a by one-hundred and eighty degrees. In this manner, prior to cutting the hole in the surface W, centerlines can be marked on the wall W (e.g., with a pencil, etc.) and when placing the frame assembly 12 against the wall W, the centerlines can be located and positioned in the notches 144a to ensure a properly positioned hole.

When the template 14 is assembled, it is loaded into the frame assembly 12 from the rear. Particularly, the template 14 is inserted into the template-receiving opening 26 until the lips 132 and 26a interengage. The square configuration of the template 14 enables the template 14 to be placed in the opening 26 in any orientation. The square configuration of the template 14 further cooperates with the levels 36,38 to ensure the template is positioned on the level against the wall W. In other words, when using the tool 10 as illustrated in FIG. 1, the horizontal level 36 indicates when the template 14 is level. However, the tool 10 could be used with the frame assembly 12 rotated ninety degrees relative to the orientation shown in FIG. 1 (e.g., if there is insufficient clearance to use the tool 10 otherwise). With this orientation, the vertical level 38 indicates when the template 14 is level. Additionally, regardless of the orientation, one of the multiple template dust ports 126 will communicate with the dust passageway 26b. When the vacuum source 16 is activated (as detailed below) and the dust control valve 104 is out of the closed position, the negative air pressure will draw any dust particles created during the cutting process into the dust ingress 134, through the respective template dust port 126, through the dust passageway 26b, and into the dust inlet 68. As detailed below, the dust particles are then vacuumed into the vacuum source 16 for easy and clean disposal.

Figure 10:
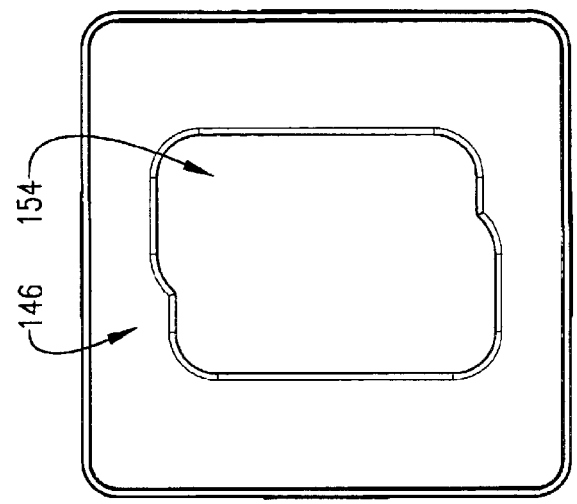
FIG. 10 is a front elevational view of a single gang box template similar to the template illustrated in FIG. 9 but without the centerline web.
Figure 13:
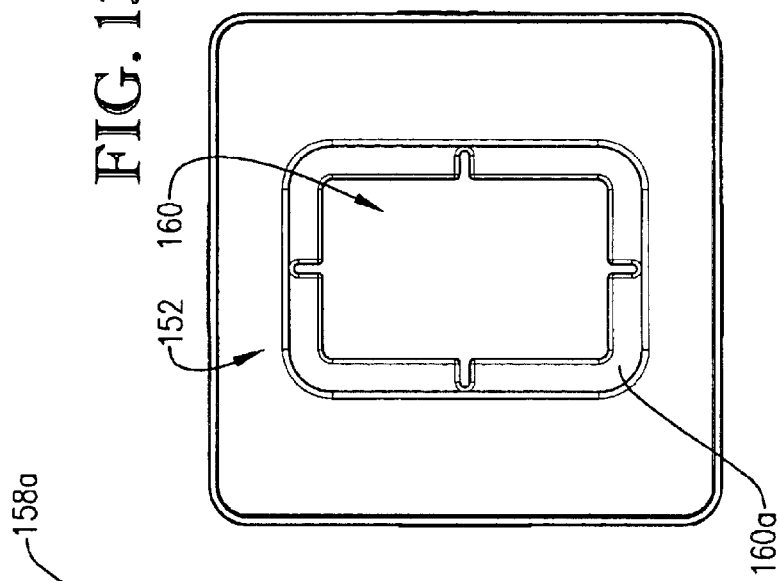
FIG. 13 is a front elevational view of a non-box template for use in the frame assembly illustrated in FIGS. 1–8.
Figure 12:
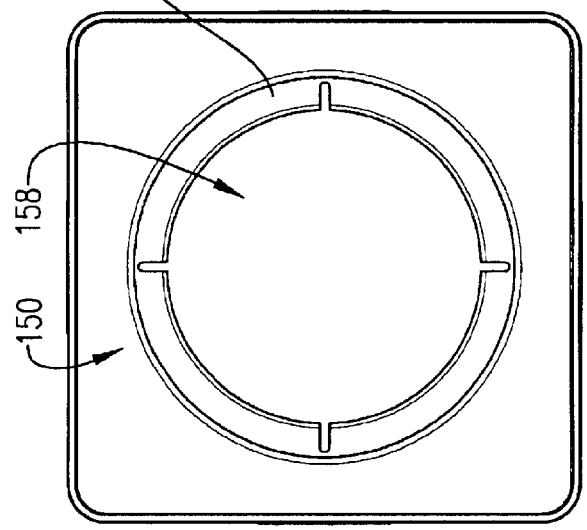
FIG. 12 is a front elevational view of a 4-O gang box template for use in the frame assembly illustrated in FIGS. 1–8.
Figure 11:
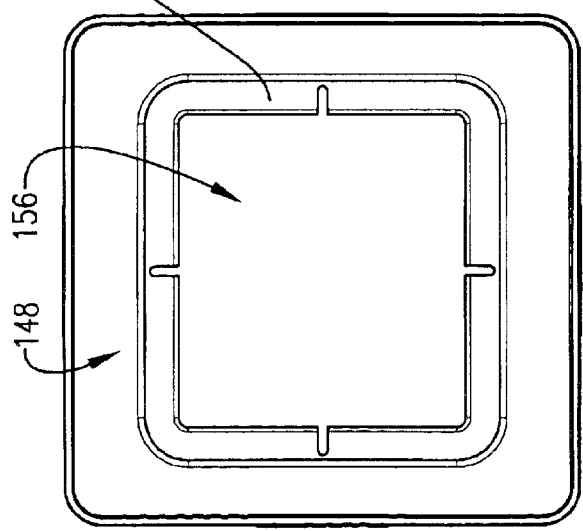
FIG. 11 is a front elevational view of a double gang box template for use in the frame assembly illustrated in FIGS. 1–8.

As indicated above, the template 14 is removably supported in the frame assembly 12 to enable the template 14 to be readily removed and interchanged with one of a plurality of additional templates. As shown in FIGS. 10–13, the illustrated hole cutting tool 10 includes additional templates 146, 148, 150, and 152. All of the templates 146–152 are configured in a manner very similar to the template 14 as detailed above, however, the template opening defined by each of the templates 146–150 differs in configuration from the template opening 120 defined in the template 14. Particularly, the template 146 as shown in FIG. 10 is a single gang template defining an opening 154 configured to correspond to the outline of a hole sized to receive a single gang electrical outlet box. However, unlike the opening 120, the opening 154 does not include the centerline web. The template 148 as shown in FIG. 11 is a double gang template defining an opening 156 configured to correspond to the outline of a hole sized to receive a double gang electrical outlet box. The opening 156 includes a centerline web 156a. The template 150 as shown in FIG. 12 is a 4-O template defining an opening 158 corresponding to the outline of a hole sized to receive a 4-O electrical outlet box. The opening 158 includes a centerline web 158a. The template 152 as shown in FIG. 13 is a non-box template defining an opening 160 corresponding to the outline of a hole sized to receive a non-box. The opening 160 includes a centerline web 160a. It is within the ambit of the present invention to utilize various alternative template configurations, with or without centerline webbing, and defining an opening corresponding to virtually any type of hole to be cut. The template need not be removable from the frame assembly and could be, for example, integrally formed therewith. However, the templates are preferably configured to simultaneously remove dust from the cutting area during the cutting process.

Returning to FIGS. 1–3 and 6, the vacuum source 16 is in selective air communication with the attachment chambers 50,52 and the dust inlet 68 and is operable to secure the frame assembly 12 against the surface W in the temporarily immobilized condition when the source 16 is in air communication with either the chamber 50 or the chamber 52 to permit the hole to be cut in the surface W using the template-defined opening 120 as a guide. The illustrated vacuum source 16 generates negative air pressure through one or both of the chambers 50,52 and the dust inlet 68 when the source 16 is activated and the valve assembly 24 is appropriately positioned as detailed above. Particularly, when the vacuum valve 100 is in the dual chamber position, the vacuum source 16 draws negative air pressure through both of the attachment chambers 50,52. When the vacuum valve 100 is in the left chamber position, the source 16 draws negative air pressure only through the attachment chamber 52. When the vacuum valve 100 is in the right chamber position, the source 16 draws negative air pressure only through the attachment chamber 50. Regardless of the position of the vacuum valve 100, the vacuum source 16 draws negative air pressure through the dust inlet 68 if the dust control valve 104 is out of the closed position.

The vacuum source 16 is configured to secure the frame assembly 12, loaded with one of the templates 14, 1146–152, in the temporarily immobilized condition (as shown in FIG. 1) against the wall W if negative air pressure is drawn through at least one of the attachment chambers 50,52, even if negative air pressure is also being drawn through the dust inlet 68. In this regard, the vacuum source 16 is preferably capable of generating around one-hundred CFMs of negative air pressure through a one and one-half inch supply hose. The illustrated vacuum source 16 is a standard electrical powered vacuum including a supply hose 162 having a standard frictional press fitting 164 for attachment with most tube-like accessories. Additionally, the source 16 preferably includes a tank sized and dimensioned to be portably worn on the user's back. One suitable vacuum source is available as an unmodified Standard VP6 vacuum from Windsor Industries Inc. of Englewood, Colo. However, any suitable vacuum could be utilized and as detailed below, the frame assembly 12 is configured to quickly and removably receive any standard vacuum hose. Additionally, as will be detailed below, the illustrated vacuum source 16 includes activation controls 166 for turning the source 16 on and off.

The vacuum supply hose 162 is preferably coupled to the manifold 22 so that the hose 162 draws negative air pressure directly through the flow through section 74. In more detail, the illustrated hole cutting tool 10 includes a vacuum coupling 168 that is permanently and rotatably coupled to the outermost cylindrical collar 74a of the manifold 22. As shown in FIG. 6, the coupling 168 engages the collar 74a and is rotatably held in position by a coupling collar 170. The coupling collar 170 fits over the coupling 168 and over the collar 74a. The coupling collar 170 could be permanently attached to the collar 74a, for example, both collars 74a,170 could be formed of PVC material and chemically joined in any manner known in the art. The press fitting 164 of the supply hose 162 is then press fit onto the coupling 168 as shown in FIG. 1.

The hole cutting tool 10 is preferably configured to enable the user to activate the vacuum source 16 while gripping the handles 28,30 of the frame assembly 12. In this regard, the illustrated tool 10 includes a pneumatic control 172 housed in the handle 28 and configured to communicate with the activation controls 166 to thereby turn the vacuum source 16 on and off. The control 172 includes a pneumatic switch housed within the handle post 88 that pneumatically communicates with the internal electric switch of the controls 166 through a pneumatic line (not shown). For example, the line passes through apertures 98 in the manifold 22 and attaches to a coupler 174 on the frame assembly 12 (see FIG. 2). An additional line (not shown) then extends from the coupler 174 into the vacuum source 12 where, in one manner known in the art, communicates with the electric switch to turn the vacuum source on or off as the control 172 is depressed. However, the control 172 could be variously configured, although it is preferable that the control is wireless (e.g., transmitter activated in the handle 28 that communicates with a receiver housed in the controls 166, etc.), the control could simply be hard wired directly to the vacuum source 16. Additionally, the vacuum source 16 could be simply activated by a toggle switch located on the vacuum source 16.

As illustrated in FIG. 1, the powered cutter 18 is operable to cut the hole in the wall W, using the template-defined outline 120 as a guide, when the frame assembly 12 is in the immobilized condition against the wall W. The illustrated cutter 18 is an electrical powered router-type cutter including a base 176 that houses the rotary power supply, a shaft 178 extending from the base 176, a collar 180 fixed relative to the shaft 178, and a removable cutting bit 182 rotatably driven by the power supply. The shaft 178 is preferably configured to enable the base to be placed against the template 14 while enabling the bit 182 to cut clear through the depth of the wall W. In this regard, it has been determined that the shaft 178 preferably extends from the base 176 about one and one-quarter inches between the base 176 and the bit 182 (or bit-receiving nut, if used). The collar 180 is preferably configured to enable the collar 180 to ride along the router collar guide 128a will allowing the bit 182 to trace the template-defined opening 120. In this regard, it has been determined that the offset between the edge of the collar 180 and the edge of the bit 182 is preferably about seven-sixteenths of an inch. The bit 182 is preferably a one-eights inch bit or a one-quarter inch bit. The powered cutter 18 is preferably capable of rotating the bit 182 at least about 30,000 rpms. One suitable powered rotary tool is available as Model No. PC-T6C from Nantong Guoqiang Electric Tools Co. Ltd. of Quidong City, Jiangsu Provence, China. Although a powered router-type cutter is preferred, it is within the ambit of the present invention to utilize any suitable cutting tool, such as a power saw, drill, or manual saw or punch.

It will be appreciated that the hole cutting tool 10 has many applications and thus can be configured with various accessories to facilitate these applications. For example, the illustrated hole cutting tool 10 is particularly well suited for cutting consistently shaped holes in the wall W for receiving electrical fixtures and/or boxes as detailed above. Many times, it is desirable to locate these consistently shaped wall holes at uniform and/or standard distances from the floor and/or ceiling. In this regard, the illustrated hole cutting tool 10 includes an upright locating rod 184 adjustably received in the handle 30 for positioning the frame assembly 12 at a uniform, repeatable distance from the floor or ceiling (see FIGS. 1–3). The rod 184 is slidably received in the handle post 90 and slides through the apertures 96. The tool 10 further includes a adjustable clamp 186 that is threadably received in the manifold 22 and can be threaded into engagement with the rod 184 to hold the rod 184 in position. In this manner, the frame assembly 12 can be placed against the surface W at the desired location and the rod 184 can be released until it contacts the floor, wherein the clamp 186 can be tightened to set the rod 184 in position. The frame assembly 12 can then be moved to the next hole location and the height maintained from the last cut by simply resting the rod 184 on the floor again.

Figure 15:
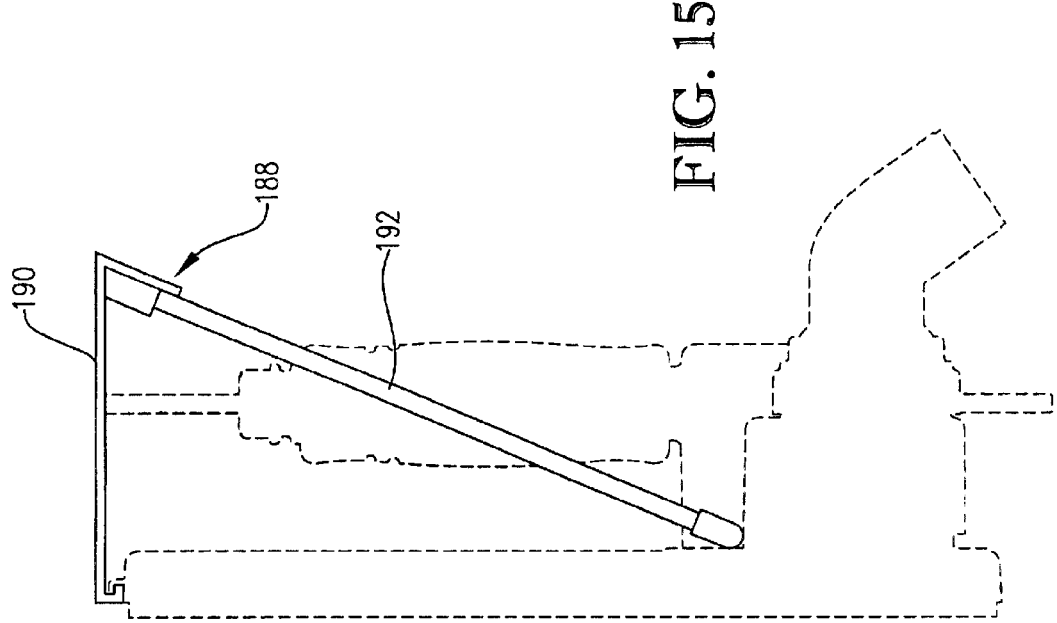
FIG. 15 is a side elevational view of the hole cutting tool including the shelf attachment as shown in FIG. 14 with the frame assembly shown in phantom.
Figure 14:
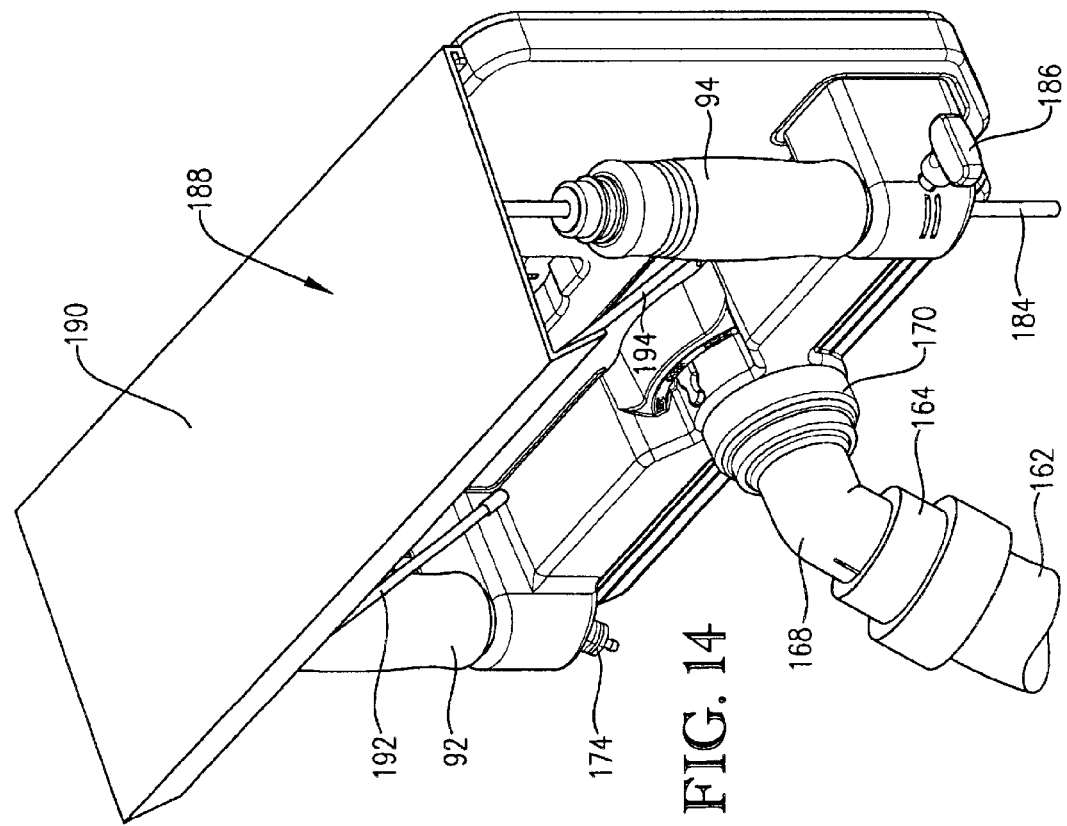
FIG. 14 is a perspective view of the hole cutting tool as illustrated in FIGS. 1–13 with the power cutter removed and the vacuum source shown in fragmentary to illustrate a shelf attachment removably coupled to the frame assembly.

Turning now to FIGS. 14 and 15, the illustrated hole cutting tool 10 further includes an attachable shelf 188 that can be removably coupled to the frame assembly 12, and supported thereon, for holding items against the wall W when the frame assembly 12 is in the immobilized condition. The shelf 188 includes a generally flat work surface 190 and a pair of vertical supports 192 and 194. The shelf 188 is configured to clip onto the shelf attachment clip 40 of the base plate 20. The supports 192,194 are configured to engage the top of the manifold 22 to further support the work surface 190. In this manner, when the frame assembly 12 is placed against the wall W in the immobilized condition, the shelf 188 can be attached to provide handsfree support for items such as fuse boxes, electrical troughs, etc., that the user desires to mount to the wall W. It is within the ambit of the present invention to utilize various alternative configurations for the hole cutting tool 10, including any suitable accessories. However, it is important that the hole cutting tool provide the user with a template for cutting a hole in a surface that adheres to the surface in a handsfree manner. Although preferred, it is not important that the tool also provide simultaneous dust removal.

In operation, a template, such as the template 14, is loaded into the rear of the frame assembly 12. The user then grasps the handles 28,30 and places the frame assembly 12 against the wall W in the desired location. The location can be precisely located by marking center lines on the wall W and then using the centerline web 144 to align the frame assembly 12. Alternatively, the locating rod 184 can be utilized to set the height and the levels 36,38 can be used to ensure the frame assembly 12 is correctly oriented. With the frame assembly 12 pressed up against the wall W, the gaskets, such as the gasket 56 of the chamber 50, make sealing contact with the surface W thereby closing the otherwise open faces of the attachment chambers 50,52.

Once the frame assembly 12 is properly positioned against the wall W, the user switches the valve control bar 112 to the "Both" designation and activates the control 172 on the handle 28 thereby activating the vacuum source 16 to draw negative air pressure across the attachment chambers 50,52. This causes the frame assembly to adhere to the wall W in the temporarily immobilized condition. The user then slides the dust valve control knob 116 out of the closed position to draw negative air pressure across the dust inlet 68 and thus through the dust ingress 134.

Once the frame assembly 12 has adhered itself to the wall W, the user can then completely remove his or her hands from the assembly 12 and grasp the power cutter 18. The user then manipulates the cutter 18 to run the collar 180 along the router collar guide 128a, thereby causing the bit 182 to trace along the template-defined outline 120 until the single gang hole has been cut. The dust and residue particles created during the cutting process are immediately and simultaneously removed through the dust ingress 134, through the dust inlet 68, and into the vacuum source 16.

Although shown in use against a relatively flat wall W, the inventive gaskets, such as the gasket 56, enable the frame assembly to adhere to semi-flat surfaces for cutting holes therein, such as a popcorn-type ceiling. Additionally, the frame assembly 12 can be adhered to a surface already having a hole cut therein, even where a portion of the frame assembly 12 overlays the already-cut hole. For example, if the user desires to cut a multi-gang hole (e.g., more than a double gang hole), the user simply places the double gang template 148 in the frame assembly 12 and cuts the first hole as described above. Next, the user regrasps the handles 28,30 and depresses the control 172 to deactivate the vacuum source 16. The user then slides the valve control 112 to the "Right" designation and places the frame assembly 12 against the wall W so that the left attachment chamber 52 is positioned over the already-cut hole and the right attachment chamber 50 is over uncut wall surface. The template 148 is preferably aligned with the right-most cut edge of the already-cut hole. The user then reactivates the vacuum source 16 thereby adhering the frame assembly 12 to the wall W in the immobilized condition, and the hole cutting steps detailed above are repeated.

The preferred forms of the invention described above are to be used as illustration only, and should not be utilized in a limiting sense in interpreting the scope of the present invention. Obvious modifications the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following.

What is claimed is:

1. A hole cutting tool for cutting a hole in a surface, said tool comprising:

a portable frame assembly adapted to be selectively placed against the surface in which the hole is to be cut, said portable frame assembly including a first attachment chamber and a second attachment chamber pneumatically isolated from the first chamber when the frame is placed against the surface;

a template supported in the frame assembly and positioned at least in part between the first and second chambers, said template defining an opening in the frame assembly that corresponds at least in part to the outline of the hole to be cut; and a source of negative air pressure in selective air communication with the first and second chambers and operable to secure the frame assembly against the surface in a temporarily immobilized condition when the negative air pressure source is in air communication with either the first or second chambers to permit the hole to be cut in the surface using the template-defined opening as a guide.

2. The tool as claimed in claim 1, said portable frame assembly including a slide valve for selectively controlling air communication between the negative air pressure source and the first and second attachment chambers.

3. The tool as claimed in claim 2, said valve being slidable between first, second, and third control positions, said valve generally preventing air communication between the negative air pressure source and the second attachment chamber and generally enabling air communication between the negative air pressure source and the first attachment chamber when the valve is in the first control position, said valve generally preventing air communication between the negative air pressure source and the first attachment chamber and generally enabling air communication between the negative air pressure source and the second attachment chamber when the valve is in the second control position, said valve generally enabling air communication between the negative air pressure source and the first and second attachment chambers when the valve is in the third control position.

4. The tool as claimed in claim 3,
said slide valve being generally cylindrical in configuration and being positioned at least in part between the first and second attachment chambers.

5. The tool as claimed in claim 4,
said portable frame assembly further including a plate and a manifold in air communication with the plate,
said plate defining at least in part the first and second attachment chambers and supporting the template,
said manifold being disposed between the negative air pressure source and the plate,
said valve being slidably supported in the manifold.

6. The tool as claimed in claim 1,
said portable frame assembly further including a plate defining at least in part the first and second attachment chambers and supporting the template,
said plate further defining a dust inlet in air communication with the negative air pressure source and the template,
said dust inlet being pneumatically isolated from the first and second chambers when the frame is placed against the surface.

7. The tool as claimed in claim 6,
said template being generally quadrate in configuration defining a four-sided outer margin,
said template defining a plurality of dust ports spaced along the outer margin each being adapted to be in air communication with the opening and the dust inlet.

8. The tool as claimed in claim 7,
said plurality of dust ports including four dust ports wherein at least one dust ports is positioned along each of the four sides of the outer margin,
said template being repositionable in the plate so that regardless of the template's position relative to the plate, at least one of the dust ports is adjacent to and in air communication with the dust inlet.

9. The tool as claimed in claim 6,
said portable frame assembly including a vacuum valve and a dust valve,
said attachment valve selectively controlling air communication between the negative air pressure source and the first and second attachment chambers,
said dust valve selectively controlling air communication between the negative air pressure source and the dust inlet.

10. The tool as claimed in claim 9,
said vacuum valve shiftable into and out of a control position wherein air communication is generally prevented between the negative air pressure source and at least one of the first or second attachment chambers,
said dust valve shiftable into and out of a closed position wherein air communication is generally prevented between the negative air pressure source and the dust inlet,
said vacuum and dust valves cooperating to enable air communication between the negative air pressure source and the dust inlet when the dust valve is out of the closed position regardless of the position of the vacuum valve.

11. The tool as claimed in claim 10,
said portable frame assembly further including a manifold disposed between the negative air pressure source and the plate and being in air communication with the plate,
said vacuum and dust valves each being shiftably supported in the manifold.

12. The tool as claimed in claim 11,
said vacuum and dust valves each being generally circular and coaxial in configuration and being positioned generally between the plate and the manifold.

13. The tool as claimed in claim 1,
said portable frame assembly further including a plate defining at least in part the first and second attachment chambers and supporting the template; and
a shelf adapted to removably couple to the plate when the frame assembly is in the immobilized condition.

14. The tool as claimed in claim 13,
said portable frame assembly further including a manifold disposed between the negative air pressure source and the plate and being in air communication with the plate,
said shelf presenting a generally flat work surface and further including at least one support member adapted to support the work surface,
said support member engaging the manifold when the shelf is removably coupled to the plate to thereby support the work surface.

15. The tool as claimed in claim 1,
said portable frame assembly including a source control in communication with the negative air pressure source and adapted to switch the negative air pressure source into and out of an activated position wherein the negative air pressure source is on.

16. The tool as claimed in claim 15,
said control including a transmitter,
said negative air pressure source including a receiver in wireless communication with the transmitter.

17. The tool as claimed in claim 15,
said control including a switch in pneumatic communication with the negative air pressure source.

18. The tool as claimed in claim 15,
said portable frame assembly including at least one handle,
said control being positioned in the handle.

19. The tool as claimed in claim 1,
said template being removably supported in the frame assembly.

20. The tool as claimed in claim 19,
said template-defined opening being generally configured to correspond to the outline of a hole sized to snugly receive a one gang electrical outlet box.

21. The tool as claimed in claim 19,
said template-defined opening being generally configured to correspond to the outline of a hole sized to snugly receive a two gang electrical outlet box.

22. The tool as claimed in claim 19,
said template-defined opening being generally circular in configuration.

23. A hole cutting tool for cutting a hole in a surface, said tool comprising:
a portable frame assembly adapted to be selectively placed against the surface in which the hole is to be cut,
said portable frame assembly defining at least one attachment chamber when the frame is placed against the surface;
a template supported in the frame assembly and defining an opening in the frame assembly that corresponds at least in part to the outline of the hole to be cut; and
a source of negative air pressure in air communication with the attachment chamber and operable to secure the frame assembly against the surface in a temporarily immobilized condition to permit the hole to be cut in the surface using the template-defined opening as a guide, said frame assembly including a plate and at least one gasket that cooperate to define said at least one attachment chamber when the frame is placed against the surface, said gasket presenting a corrugated contact surface adapted to sealingly engage the surface in which the hole is to be cut when the frame assembly is placed there against, said portable frame assembly including an additional gasket that cooperates with the plate to define an additional attachment chamber when the frame is placed against the surface, said additional gasket presenting a corrugated contact surface adapted to sealingly engage the surface in which the hole is to be cut when the frame assembly is placed there against.

24. The tool as claimed in claim 23, said corrugated contact surfaces each including at least two ridges adapted to engage the surface in which the hole is to be cut when the frame assembly is placed there against and at least one recessed groove, said ridges being adjacent to and extending along the outer margin of the respective attachment chamber.

25. The tool as claimed in claim 24,
said groove being defined between the ridges.

26. The tool as claimed in claim 24, said ridges being generally concentric and extending coextensive with the outer margin of the respective attachment chamber.

27. The tool as claimed in claim 26, each of said gaskets defining the outer margin of the respective attachment chamber.

28. The tool as claimed in claim 23, each of said gaskets being substantially formed from a thermoplastic elastomer material.

29. The tool as claimed in claim 28,
said material presenting a hardness of between about eight and about ten on the Durometer A scale.

30. The tool as claimed in claim 23, said corrugated contact surfaces each including at least three ridges adapted to engage the surface in which the hole is to be cut when the frame assembly is placed there against and at least two recessed grooves.

31. The tool as claimed in claim 30,
said grooves being defined between the respective ridges.

32. The tool as claimed in claim 31, said ridges being generally concentric and extending coextensive with the outer margin of the respective attachment chamber.

33. The tool as claimed in claim 23,
said additional attachment chamber being pneumatically isolated from the first mentioned attachment chamber when the frame assembly is placed against the surface, said negative air pressure source being in selective air communication with the first mentioned and additional attachment chambers and operable to secure the frame assembly against the surface in the temporarily immobilized condition when the negative air pressure source is in air communication with either the first mentioned or additional attachment chambers.

34. The tool as claimed in claim 33,
said portable frame assembly including a slide valve for selectively controlling air communication between the negative air pressure source and the first mentioned and additional attachment chambers.

35. The tool as claimed in claim 34,
said slide valve being generally cylindrical in configuration and being positioned at least in part between the first mentioned and additional attachment chambers.

36. The tool as claimed in claim 33,
said plate further defining a dust inlet in air communication with the negative air pressure source and the template, said dust inlet being pneumatically isolated from the first mentioned and additional chambers when the frame assembly is placed against the surface.

37. The tool as claimed in claim 36,
said portable frame assembly including a vacuum valve and a dust valve, said vacuum valve selectively controlling air communication between the negative air pressure source and the first mentioned and additional attachment chambers, said dust valve selectively controlling air communication between the negative air pressure source and the dust inlet.

38. The tool as claimed in claim 37,
said vacuum valve shiftable into and out of a control position wherein air communication is generally prevented between the negative air pressure source and at least one of the attachment chambers, said dust valve shiftable into and out of a closed position wherein air communication is generally prevented between the negative air pressure source and the dust inlet, said vacuum and dust valves cooperating to enable air communication between the negative air pressure source and the dust inlet when the dust valve is out of the closed position regardless of the position of the vacuum valve.

39. The tool as claimed in claim 23, and a shelf adapted to removably couple to the plate when the frame assembly is in the immobilized condition.

40. The tool as claimed in claim 39,
said portable frame assembly further including a manifold disposed between the negative air pressure source and the plate and being in air communication with the plate, said shelf presenting a generally flat work surface and further including at least one support member adapted to support the work surface, said support member engaging the manifold when the shelf is removably coupled to the plate to thereby support the work surface.

41. The tool as claimed in claim 23, said portable frame assembly including a source control in communication with the negative air pressure source and adapted to switch the negative air pressure source into and out of an activated position wherein the negative air pressure source is on.

42. The tool as claimed in claim 41,
said control including a transmitter,
said negative air pressure source including a receiver in wireless communication with the transmitter.

43. The tool as claimed in claim 41,
said control including a switch in pneumatic communication with the negative air pressure source.

44. The tool as claimed in claim 41,
said portable frame assembly including at least one handle,
said control being positioned in the handle.

45. The tool as claimed in claim 23, said template being removably supported in the frame assembly.

46. The tool as claimed in claim 45,
said template-defined opening being generally configured to correspond to the outline of a hole sized to snugly receive a single gang electrical outlet box.

47. The tool as claimed in claim 45,
said template-defined opening being generally configured to correspond to the outline of a hole sized to snugly receive a double gang electrical outlet box.

48. The tool as claimed in claim 45,
said template-defined opening being generally circular in configuration.

49. The tool as claimed in claim 23, said negative air pressure source comprising a vacuum source.

50. A method of cutting a hole in a surface, said method comprising the steps of:
 (a) supporting a template in a frame assembly wherein the template defines an opening in the frame assembly that corresponds at least in part to the outline of the hole to be cut;
 (b) placing the frame assembly against the surface in which the hole is to be cut,
 said portable frame assembly including a first attachment chamber and a second attachment chamber pneumatically isolated from the first chamber when the frame is placed against the surface;
 (c) sucking negative air pressure through one of the first and second attachment chambers to thereby secure the frame assembly against the surface in a temporarily immobilized condition;
 (d) cutting a hole in the surface using the template-defined opening as a guide; and
 (e) switching the negative air pressure to the other one of the first and second attachment chambers while maintaining the frame assembly in the immobilized condition.

51. The method as claimed in claim 50,
step (e) being performed after step (c).

52. The method as claimed in claim 50,
step (d) being performed after step (c) and before step (e); and
 (f) repeating step (d) after step (e).

53. The method as claimed in claim 50,
step (c) including the step of sucking negative air pressure through both of the attachment chambers,
step (e) including the step of sucking negative air pressure through only one of the attachment chambers.

54. The method as claimed in claim 53,
step (e) further including the step of switching the negative air pressure to only the other one of the attachment chambers.

* * * * *